United States Patent [19]

Dicky

[11] Patent Number: 4,684,070

[45] Date of Patent: Aug. 4, 1987

[54] SHREDDED TIRE OVERSIZE SCRAP RETURN ELEVATOR

[75] Inventor: John Dicky, North Tonawanda, N.Y.

[73] Assignee: Columbus McKinnon Corporation, Amherst, N.Y.

[21] Appl. No.: 777,968

[22] Filed: Sep. 20, 1985

[51] Int. Cl.[4] ............................................. B02C 23/12
[52] U.S. Cl. .................................... 241/79.3; 241/80; 241/101.2; 241/236; 241/DIG. 31
[58] Field of Search ................. 198/509, 703; 241/80, 241/97, 236, 101.2, 101.4, 79.3, 223, 224, 225, 101.5, DIG. 31

[56] References Cited

U.S. PATENT DOCUMENTS

| | | | |
|---|---|---|---|
| 3,578,252 | 5/1971 | Brewer | 241/141 |
| 3,656,697 | 4/1972 | Nelson | 241/222 |
| 3,727,850 | 4/1973 | Krigbaum | 241/159 |
| 3,841,570 | 10/1974 | Quinn | 241/78 |
| 3,931,935 | 1/1976 | Holman | 241/24 |
| 4,134,556 | 1/1979 | Ehrlich et al. | 241/80 X |
| 4,156,508 | 5/1979 | Kisielewski | 241/80 |
| 4,216,916 | 8/1980 | Tupper | 241/36 |
| 4,363,450 | 12/1982 | Schmidt | 241/24 |

Primary Examiner—Mark Rosenbaum
Attorney, Agent, or Firm—Bean, Kauffman & Bean

[57] ABSTRACT

There is disclosed in a unitized automotive vehicle tire shredding system a rotating drum type elevator for receiving from a screening device heterogeneously mixed scraps of shredded tires or the like which include components of curvilinear shape and resilient characteristics. The drum carries the scraps to an elevated point of discharge to fall therefrom by gravity into a shredding machine and from there down again upon the screening device. The drum includes an annular trough-like portion for carrying the scrap when deposited into a lower portion thereof upwardly to the point of discharge when the drum is rotated, and a material travel control device comprising a trough-shaped channeler of convergent sectional form having side walls peripherally configured to complement the curvatures of said rim and flange wall members. The control device is stationarily mounted interiorly of said drum in open-facing opposition to the rising segment of said drum when rotating and receives and funnels into increasingly densified condition the scrap materials during the elevating process.

5 Claims, 6 Drawing Figures

SHREDDED TIRE OVERSIZE SCRAP RETURN ELEVATOR

BACKGROUND AND OBJECT OF THE INVENTION

This invention relates to apparatus for shearing, chopping or shredding solid materials, and more particularly for converting stockpiled environmentally designated "waste" items of various sizes, shapes and substances into substantially uniformly reduced particle size products, for more efficient permanent disposal, commercial recycling, or other utilization. Waste items such as are particularly difficult to handle by such machines include for example scrap automobile and truck tires and scrap insulated electrical conductors and the like, because of the unique tumble/flow characteristics of the remnants of such items after they have been chopped or shredded. Typically, an apparatus for such purposes includes conveyor means for carrying the items to be processed from ground level to the gravity in-feed of a shredding mechanism; and a classifying device for passing to discharge products which have been reduced thereby to prescribed particle sizes.

It is know that grinding/shredding/chopping machines in systems of the type referred to may be most efficiently operated from the power, time and labor cost standpoints in such manner that the "first pass" of items through the machine need not all be at once reduced to the prescribed maximum sized product. This is because the effects of alternately peak and minimum or no power demand fluctuations invariably encountered in the feeding of such machines may be minimized by use of oversize remnant return elevators. Accordingly, oversize return elevators are usually employed and the shredding or chopping machines are set to initially pass some percentage of oversize remnants. However, the present invention provides for such systems an improved oversize remnant return elevator which more efficiently copes with the specific tumble and flow characteristics of masses of the chopped or shredded remnants of the above mentioned kinds of waste items, whereby the overall efficiency of operation of the system apparatus is markedly improved.

BRIEF SUMMARY OF THE INVENTION

Stockpiled waste items of the type referred to typically comprise components, some of which are relatively soft but resilient, and some of which are relatively strong and resilient. Other parts may be brittle, and still others soft and nonresilient. Thus, the products discharged by the chopper or shredder (which for convenience will hereinafter be referred to as the shredder) typically comprise a heterogeneous mix of relatively large sized curvilinear or concave shaped resilient pieces and relatively small sized solid particulates. When masses of such mixtures are being conveyed from one locale to another, the resilient components thereof are agitated and the mass "flow" characteristics of such mixtures are quite different from the flow patterns of homogeneous mixtures. This is especially true when the components of the heterogeneous mix are of different specific gravities.

Also, the curled resilient portions of such mixtures resist corralling into any relatively confined space such as would enable the mass thereof to be volume-wise condensed for efficient handling. Therefore, oversize return elevators for such purposes have heretofore been designed to handle low bulk density masses, requiring uneconomical capital investments in equipment operated at well below efficiency levels. The present invention provides means for handling such mixtures in a rotary drum type elevator which operates in an improved manner to corral such mixtures and conduct them in orderly fashion so as to smooth out the flow of material from the locale of the elevator intake to its point of discharge; and also to discharge the thereby elevated heterogeneous mix back into the shredder for reprocessing in an improved manner.

Machines for similar purposes are disclosed for example in U.S. Pat. Nos. 3,578,252; 3,656,697; 3,727,850; 3,841,570; 3,931,935; 4,134,556; 4,156,508; 4,216,916 and 4,363,450.

DESCRIPTION OF THE PREFERRED EMBODIMENTS GENERAL

Figure 1:
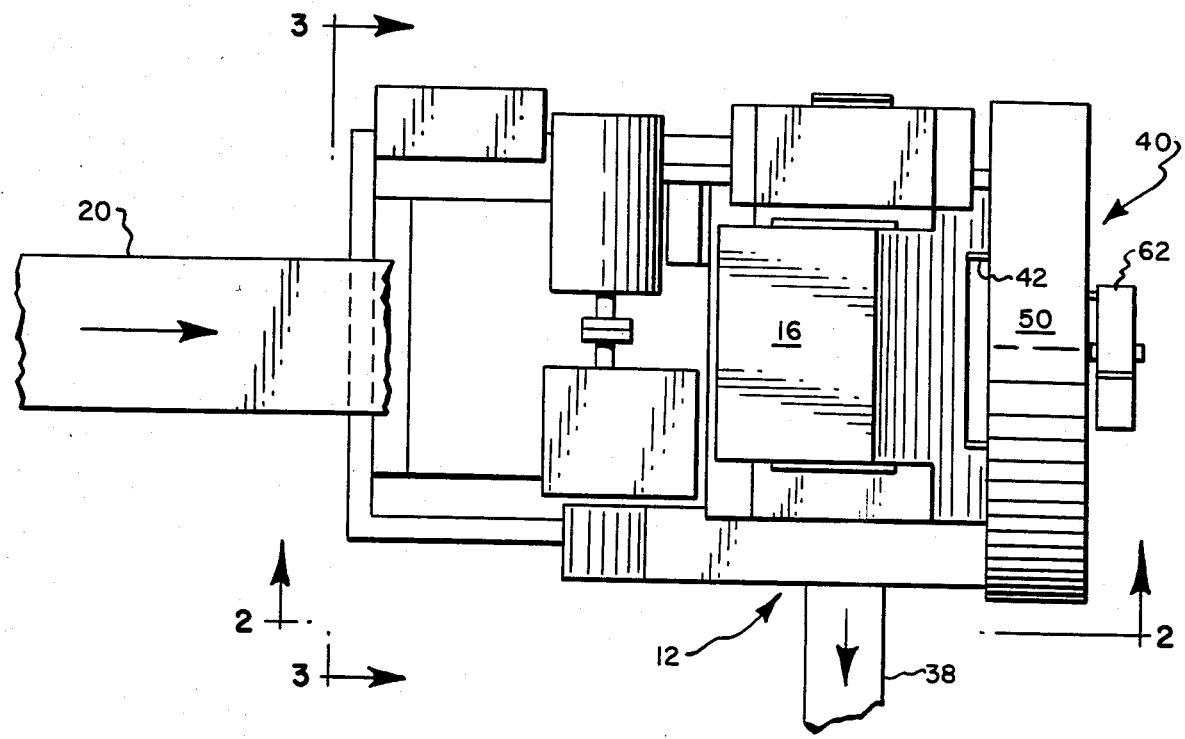
FIG. 1 is a plan view of a machine embodying the present invention, showing the relative arrangement of major components of the machine.
Figure 2:
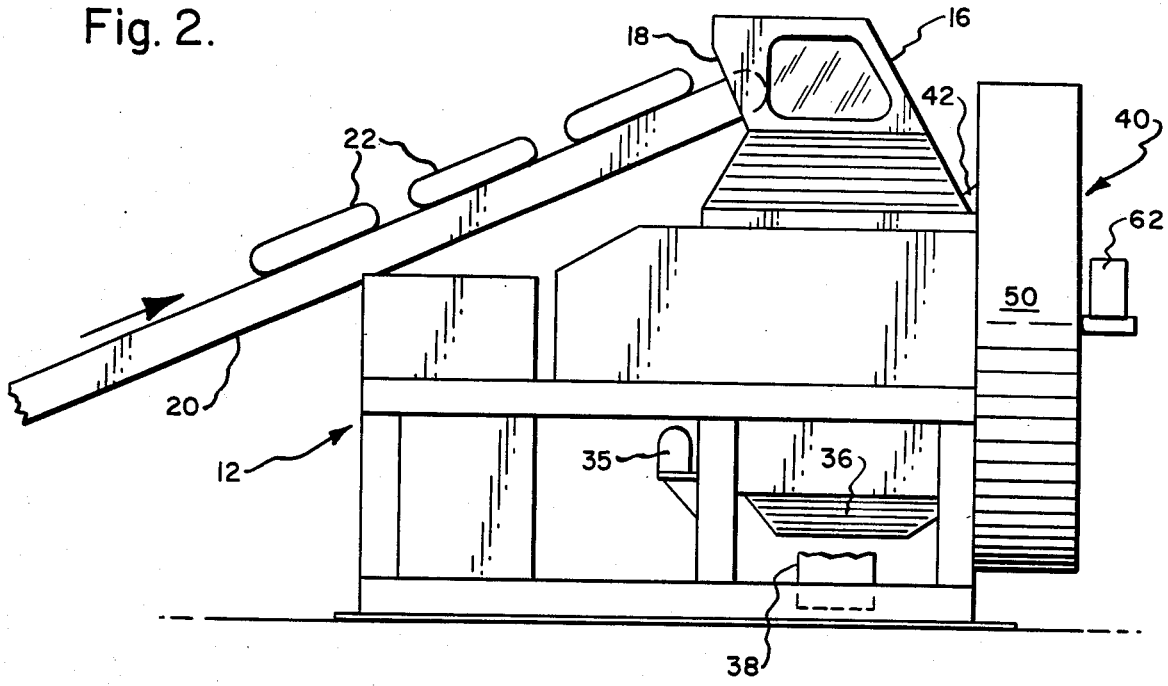
FIG. 2 is a side elevational view of the machine of FIG. 1.
Figure 3:
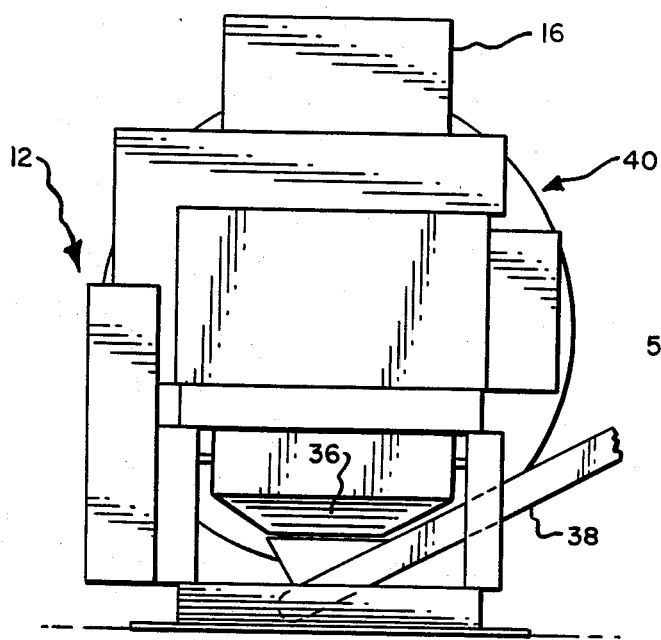
FIG. 3 is an end view taken as along line 3—3 of FIG. 1.
Figure 4:
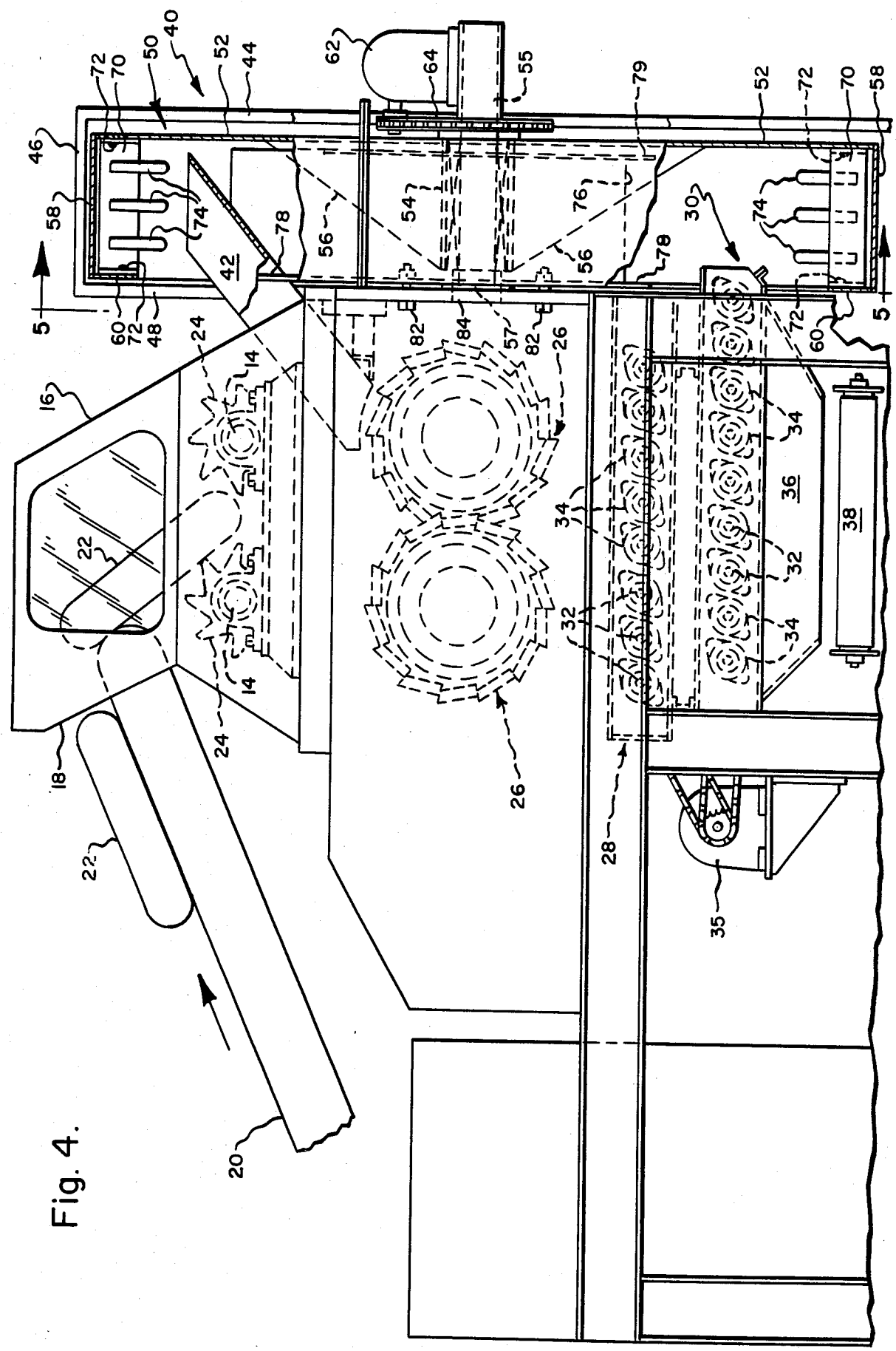
FIG. 4 is an elevational view similar to FIG. 2 but on enlarged scale, with cut-away portions to show interior details.

As shown by way of example at FIGS. 1-3, the invention may be embodied in a machine comprising a frame designated generally by the numeral 12 which houses at an upper level a pair of parallel disposed in-feed rollers 14,14 (FIG. 4). A hood 16 surmounts the in-feed rollers and is open at one side as shown at 18 to permit an in-feed conveyor 20 to discharge materials 22 to be processed down and in-between the rollers 14,14. The rollers 14,14 carry sprockets 24 and are driven to rotate in opposite directions so as to grip upon and drag down therebetween the objects to be shredded into the shredder rolls such as are designated generally by the numerals 26,26.

The shredded remnants fall by gravity into the classifier compartment of the machine which in the case of the present invention is illustrated as being occupied by a pair of superposed classifying units designated generally by the numerals 28 and 30 (FIG. 4). Such classifier units may comprise gangs of parallel disposed rollers 32 carrying discs 34 and are driven as by a motor 35 to rotate in clockwise direction as viewed in FIG. 4. Shredded materials of designated particle sizes fall therethrough onto a chute 36 leading to a product takeaway conveyor 38. Oversize particles remaining on top of the classifier units are conveyed transversely thereby and delivered into the return elevator such as is designated generally by the numeral 40 and is of the rotary drum type. The oversize particulates are thereby delivered again, such as by a gravity chute 42, into the shredder rolls for reprocessing thereby.

THE OVERSIZE PRODUCT RETURN ELEVATOR

Figure 6:
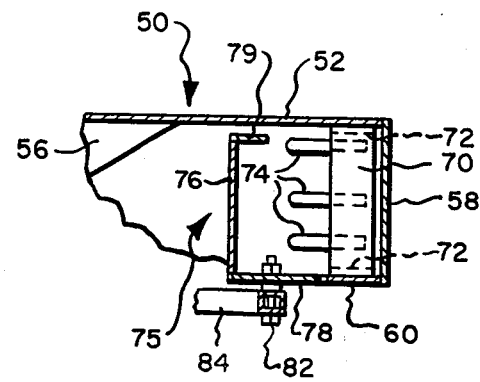
FIG. 6 is a fragmentary sectional view taken as along line 6—6 of FIG. 5.
Figure 5:
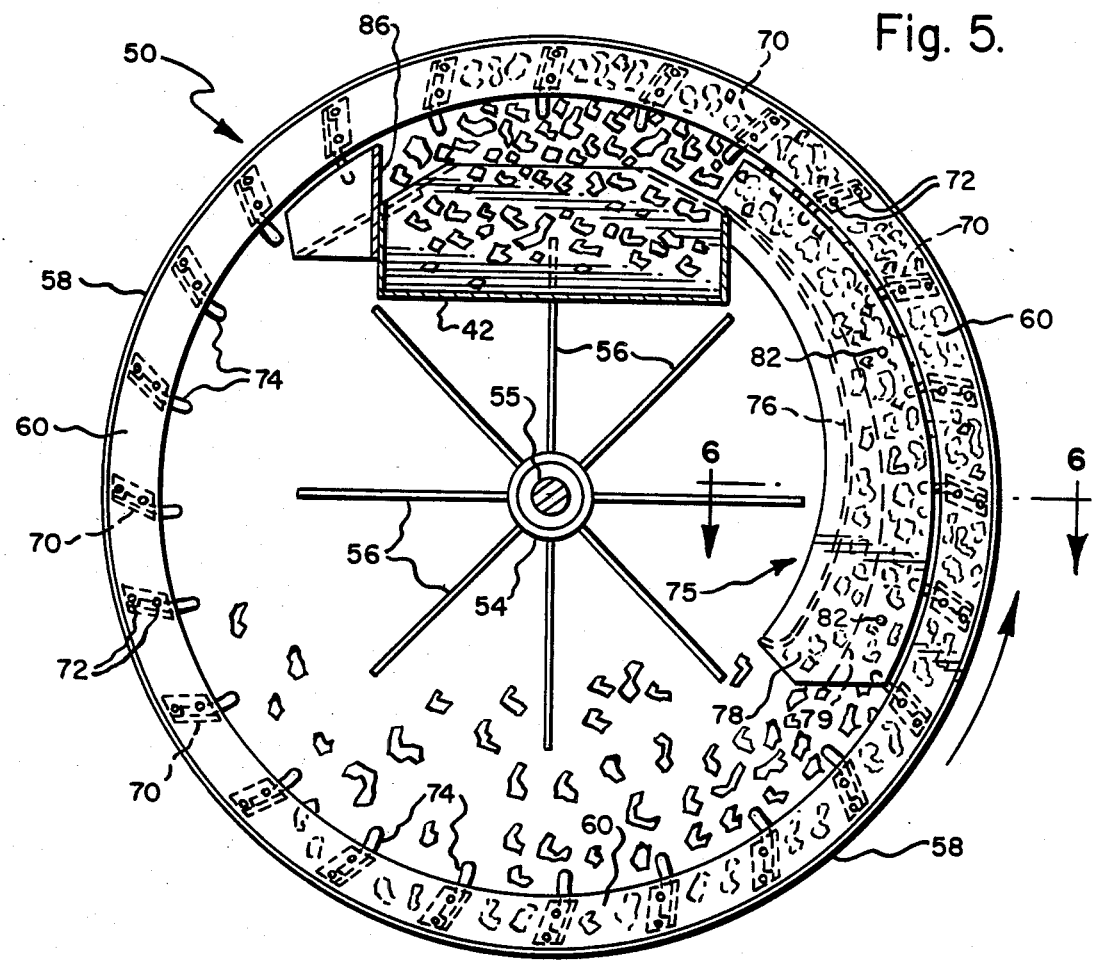
FIG. 5 is a view taken as along line 5—5 of FIG. 4.

Whereas the return elevator of the present invention may appear to be generally quite similar to elevators shown in some of the above referred to prior patents, it differs therefrom in several important respects. As best shown by FIGS. 4-6, the elevator is housed within a structure comprising a disc-shaped side wall member 44, a rim member 46, and an opposite side plate portion 48 which is attached to the main frame of the machine so as to stand rigidly therewith. The elevator per se is shown generally by the numeral 50 and comprises a disc-shaped side wall member 52 which is keyed to and stabilized by a central drive hub 54 by means of fins 56. A stationary post 55 extends rigidly from the machine frame as shown at 57, and rotatably carries the hub 54 thereon by means of bearings as shown.

A peripheral rim 58 and an annular flange portion 60 completes the basic structure of the drum 50. A motor 62 mounted on the stationary post 55 is connected to the hub 54 for rotating the latter, such as by means of a chain and sprocket arrangement as shown at 64. Thus, it will be understood that the drum is rotatably carried on the post 55 and comprises one solid outside wall, a solid peripheral rim 58, and an annular flange portion 60 providing a partial side wall opposite to the solid side wall 52. There is thus provided a trough-like peripheral portion of the drum which is occupied at spaced apart intervals by lift plates 70 which are flanged and fastened to the wall members 52 and 60 such as by means of fasteners 72. The plates 70 are preferably directionally canted somewhat forwardly of radial direction relative to the axis of rotation of the drum, so as to provide efficient scoops for engaging the scrap materials to be elevated; and also each plate is provided with several forwardly protruding fingers such as are shown at 74 which extend therefrom radially towards the axis of rotation of the drum.

As shown at FIGS. 5 and 6, an arcuately shaped material channeler which is designated generally at 75 is carried by the stationary frame structure so as to face against the uprising trough-like portion of the drum when it is rotating. The channeler comprises an arcuately shaped back wall 76 and crescent-shaped side walls 78,79 which peripherally complement the curvatures of the drum walls 60 and 58, respectively. Thus, the channeler is so contoured as to provide a sectionally converging passageway for the material being elevated for discharge into the chute 42. For example, as shown at FIGS. 5 and 6, the channeler 75 may be anchored such as by means 82 to a stationary structural member 84 of the machine frame. At its upper end, the channeler 75 terminates at one side of the receiving chute 42, and a baffle plate as shown at 86 (FIG. 5) is preferably provided at the opposite side of the chute to ensure complete delivery of the elevated material into the chute.

Thus, it will be seen that when the drum is rotating, the heterogeneous mix of oversize shredded materials discharged into the bottom of the drum 50 will be corraled by the fins 56, the scoop plates 70, and the fingers 74, and will be driven thereby into and upwardly through the channeler 75 in the form of an increasingly densified stream until released for delivery into the chute 42. Upon arrival in position above the chute 42 and beyond reach of the channeler 75, the material is released to fall by gravity out of the scoop pockets of the elevator. At this point, the fingers 74 now operate to break up any lumped together portions of the stream of elevated scraps such as tend to form by entanglements of the curvilinear portions of the mix when being compacted and conveyed upwardly within the channeler. Accordingly, a more efficiently overall operating elevator system is provided for handling heterogeneous mixtures of materials including the peculiarly shaped and resilient components as described hereinabove when the shredder machine is processing scrap automotive vehicle tires and the like.

I claim:
1. A tire shredding apparatus comprising:
   (a) a support frame;
   (b) a tire shredder mounted upon said support frame at an upper level thereof for receiving and shredding tires when fed into the inlet thereof;
   (c) a shredded tire scrap products classifier mounted on said frame beneath said shredder for receiving and dividing said products into separate streams of undersized and oversized products;
   (d) a drum-shaped wheel type elevator mounted on said frame for receiving said stream of oversized products into the lower region thereof for returning said oversized products to said shredder for reprocessing, said elevator comprising:
      (1) a disc-shaped closed side wall member rotatably mounted by means of a central hub upon a post extending horizontally from said frame;
      (2) an annularly shaped rim wall member extending axially from the peripheral portion of said side wall member;
      (3) an annular flange wall member extending radially inwardly from said rim wall member in spaced opposition to said side wall member, whereby said elevator includes a closed side wall member and an open side wall member providing an annular trough therebetween for carrying products deposited into a lower portion thereof upwardly to a higher elevation when said elevator is driven to rotate;
      (4) a plurality of lift plates transversely disposed at circumferentially spaced apart intervals within said trough to provide scoop-like pockets for carrying products when deposited therein upwardly to an elevation above said shredder when said pockets are in the uprising segment of the elevator when rotating;
      (5) chute means extending into the open side of said elevator at the upper region thereof for directing said elevated products to fall by gravity therefrom into the feed inlet of said shredder; and
      (6) an oversized products travel control device comprising a trough-shaped channeler stationarily mounted upon said frame in open-facing opposition to the rising segment of said elevator when rotating, and having side walls peripherally configured to complement the curvatures of said rim and flange wall members and being of upwardly convergent sectional area form whereby to be adapted to intake at its open lower end and funnel into increasingly densified condition said products during the elevating process thereof, and terminating in open end form in the upper region of said elevator rotation whereby said oversized products are thereupon released to fall by gravity therefrom by way of said chute means into said shredder for reprocessing.

2. A unitized tire shredding apparatus as set forth in claim 1 wherein spaced apart finger means are mounted upon said lift plates to extend beyond the leading edge portions thereof in radial directions relative to the axis of rotation of said elevator.

3. A tire shredding apparatus as set forth in claim 2 wherein a plurality of fin-like structural members extend radially from said hub and axially from said closed side wall member so as to brace the latter and to act as sweeps to assist in corraling said products and feeding them into the lower end of said channeler when said elevator is rotating.

4. A tire shredding apparatus as set forth in claim 1 wherein said lift plates are canted forwardly of radial directions relative to the axis of rotation of said elevator.

5. A tire shredding apparatus as set forth in claim 1 wherein a motor means is mounted upon said post externally of said elevator and is operably coupled thereto for driving said elevator to rotate.

* * * * *